(12) United States Patent
Scherzer et al.

(10) Patent No.: US 6,706,235 B1
(45) Date of Patent: Mar. 16, 2004

(54) METHOD FOR SHAPING A RIVET FROM A PLASTIC MATERIAL IN THE FORM OF A PIN

(75) Inventors: Joachim Scherzer, Bruchköbel (DE); Bernhard Weber, Fürstenfeldbruck (DE)

(73) Assignee: Heraeus Noblelight GmbH (DE)

( * ) Notice: Subject to any disclaimer, the term of this patent is extended or adjusted under 35 U.S.C. 154(b) by 331 days.

(21) Appl. No.: 09/723,046

(22) Filed: Nov. 27, 2000

(30) Foreign Application Priority Data

Nov. 26, 1999 (DE) .......................... 199 57 042

(51) Int. Cl.⁷ .................. B29C 65/02; B29C 65/12; B29C 65/18
(52) U.S. Cl. .................. 264/479; 264/249; 264/297.5; 264/322; 425/174.4; 425/392; 425/508; 432/31; 338/267; 338/268
(58) Field of Search .................. 264/479, 322, 264/297.5, 249; 425/174.4, 392, 508; 432/31; 338/268, 267

(56) References Cited

U.S. PATENT DOCUMENTS

| | | | | |
|---|---|---|---|---|
| 1,432,064 A | * | 10/1922 | Hadaway, Jr. .............. | 219/552 |
| 1,536,926 A | * | 5/1925 | Probst ........................ | 338/237 |
| 2,458,152 A | * | 1/1949 | Eakins ....................... | 264/230 |
| 2,510,693 A | * | 6/1950 | Green ........................ | 411/501 |
| 2,705,346 A | * | 4/1955 | Schlabach et al. .......... | 264/249 |
| 3,308,225 A | * | 3/1967 | Wells ......................... | 264/249 |
| 3,358,550 A | * | 12/1967 | Crowther et al. ............. | 411/34 |
| 3,419,297 A | * | 12/1968 | Diepenhorst et al. ......... | 403/28 |
| 4,323,761 A | | 4/1982 | Hubner ....................... | 219/377 |
| 4,531,047 A | * | 7/1985 | Canfield et al. ............. | 338/268 |
| 4,633,559 A | * | 1/1987 | Loren ......................... | 29/243.5 |
| 4,767,298 A | * | 8/1988 | Bocchicchio et al. ........ | 425/112 |
| 5,227,173 A | * | 7/1993 | Sherwood .................... | 425/143 |
| 5,296,685 A | * | 3/1994 | Burstein et al. ............. | 219/534 |
| 5,296,686 A | | 3/1994 | Ullrich et al. ............... | 219/553 |
| 5,545,878 A | | 8/1996 | Jasper, II et al. ............ | 219/541 |
| 6,296,470 B1 | * | 10/2001 | Lanser et al. ................ | 425/508 |
| 2002/0001639 A1 | * | 1/2002 | Lanser et al. ................ | 425/508 |
| 2002/0017744 A1 | * | 2/2002 | Lochner et al. .............. | 264/479 |

FOREIGN PATENT DOCUMENTS

| | | |
|---|---|---|
| CH | 407 357 | 8/1966 |
| DE | 839 396 | 5/1952 |
| DE | 1 604 607 | 1/1972 |
| DE | 28 54 393 | 7/1980 |
| DE | 154 563 | 3/1982 |
| SU | 14 45 979 | 12/1988 |

* cited by examiner

Primary Examiner—Michael Colaianni
Assistant Examiner—Michael I. Poe
(74) Attorney, Agent, or Firm—Ostrolenk, Faber, Gerb & Soffen, LLP

(57) ABSTRACT

An apparatus for heating a pin shaped thermoplastic material is provided including a quartz tube, a heat radiator and a securing mechanism. The quartz tube has tube ends and is helix shaped. The heat radiator is arranged in the quartz tube and includes an electrical resistance wire connected to a power supply. The securing mechanism is a heat resistant element connected to the quartz tube that secures the part to be heated relative to the quartz tube along an axis of the quartz tube and heats the plastic part. The quartz tube and/or the part to be heated are moveable. An apparatus is also provided for heating a number of pin shaped plastic parts simultaneously. In addition, a method for heating one or more pin shaped plastic parts is also provided.

4 Claims, 4 Drawing Sheets

METHOD FOR SHAPING A RIVET FROM A PLASTIC MATERIAL IN THE FORM OF A PIN

BACKGROUND OF THE INVENTION

1. Field of the Invention

The present invention relates to an apparatus for heating parts of thermoplastic material by at least partial irradiation using a heat radiator located in a quartz tube. More particularly, the present invention relates to an apparatus comprising an electrical resistance wire which can be connected at both its ends to a power supply and a heat-resistant element for securing the quartz tube at least in the region of its tube end The present invention also relates to a method for shaping a thermoplastic part.

2. Description of the Related Art

German reference DE 28 54 393 A1 discloses a process in which thermoplastic or thermoelastic semifinished products are arranged at a suitable distance from a heat radiator until the shaping temperature is reached. The thermoplastic semifinished product at shaping temperature is formed into a desired shape in a manner known in the art. Infrared radiators are used to generate the thermal radiation.

German reference DE-A 16 04 607 discloses an apparatus for welding layers of films of thermoplastic material using an electrical heat radiator, i.e., an electrical resistance wire in a quartz tube. In this case, the electrical heat radiator is provided with a water cooled copper alloy bar of high thermal conductivity. The bar has a slot on its side directed toward the films to be welded which extends over the length of the radiator, the width of which determines the width of the weld. The bar is likewise open on its side facing away from the films to be welded and is provided with an outer reflection layer, in particular with a gold coating.

Swiss Patent 407 357 also discloses a quartz glass flow tube which has electrical heating conductors in its interior. The quartz glass flow tubes are designed in the form of pipe coils or quartz tube helixes.

In these references, the semifinished products to be treated are generally sheet-like formations or liquid substances; it is not intended for the thermal radiation to be concentrated on semifinished products of plastic material having a definite shape.

SUMMARY OF THE INVENTION

The object of the present invention is to heat small parts of plastic material, at least partially, by means of irradiation up to the softening point, and subsequently mechanically shape or connect them to one another. Such small parts might include, for example, plastic rivets.

The present invention provides a quartz tube designed in the form of a helix.

The helix is adapted so that it can be pushed along its axis onto a body of plastic material by means of an element serving as a securing means.

In an embodiment of the present invention, a multiple helix apparatus is used for simultaneous rapid low cost heating of a plurality of plastic parts.

In a further embodiment of the present invention, a resistance wire is preferably connected both electrically and mechanically at both ends to stripped ends of a temperature resistant stranded wire inside the quartz tube.

In a preferred embodiment, a heating conductor spiral of an Fe/Cr/Al alloy is located in the quartz tube designed as a helix or pipe coil. The quartz tube helix is held at both ends by a heat resistant element. The heat resistant element, has, in this case, an elongated clearance, the longitudinal axis of which runs parallel to the helix axis of the quartz tube coil. The clearance is preferably formed as a drilled hole.

In a further embodiment of the present invention, the apparatus may be used, for example, in the installation of subassemblies in automobiles as part of a handling system. The apparatus is advantageous, here, in particular, due to its small dimensions.

In a further embodiment of the present invention, a reflection layer is provided in the region of the outer circumference of the helix.

In a preferred embodiment, the quartz tube helix is provided with a reflective layer on its outer side facing away from the helix axis. Preferably, the reflective layer is a gold layer applied on the outer surface of the quartz tube. This allows a relatively high energy yield to be achieved.

Another object of the present invention is to provide a simple and rapid method of shaping plastic pins into rivets by means of a compact, easy to guide heating apparatus.

The present invention provides a method of shaping a pin shaped body of plastic material, at least with respect to the part to be shaped, by heating it to shaping temperature using a quartz tube heating element as defined herein. The quartz helix is pushed at least partly onto the body of plastic material along the helix axis, and heated by a securing means. The pin shaped part may then be shaped, for example, into a rivet head, by using a rivet forming die which is moved in relation to the body of plastic material.

In an embodiment of the present invention a method for shaping at least two parts of a body of plastic material is provided including heating the plastic material to shaping temperature using at least two apparatuses. The bodies of plastic material to be shaped are designed in the form of pins, at least at the part intended for shaping. The quartz helix of each apparatus is pushed at least partly onto the respective body of plastic material and heated by a securing means. The pin shaped parts may then be shaped, for example, into a rivet head by pressing a rivet forming die onto the heated plastic part.

In an embodiment of the present invention, the process is performed with the aid of a handling apparatus.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like numerals represent similar elements, embodiments of the present invention are illustrated in schematic form as follows.

DETAILED DESCRIPTION OF THE DRAWINGS

Figure 1:
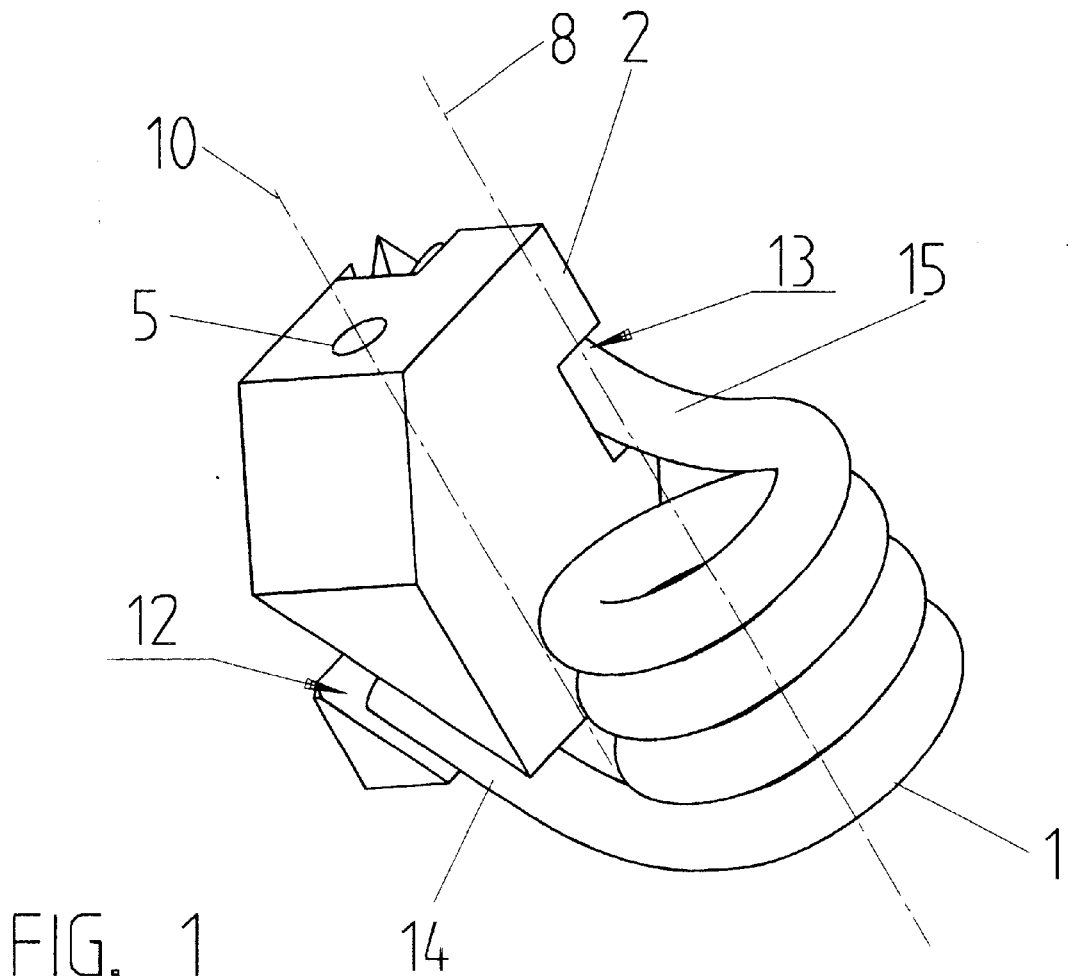
FIG. 1 shows a perspective view of a quart tube helix according to the invention having a ceramic part as a heat resistant element.

Referring now to FIG. 1, the quartz tube helix 1 has a plurality of turns, in this case four turns. The outside diameter of the quartz tube helix is in the range of from 25 to 40 mm. The quartz tube itself has an outside diameter in the range of from 6 to 8 mm and a wall thickness in the range of from 0.8 to 1.2 mm.

An Fe/Cr/Al alloy heating conductor spiral (not visible) is arranged in the helical quartz tube. The ends of the spiral are securely connected both electrically and mechanically to stripped ends of a temperature resistant, electrically insulated stranded wire inside the quartz tube. The other end of the stranded wire can be connected to a power supply for the purpose of heating the quartz helix. The quartz tube helix 1 with a heating conductor spiral lying inside (not visible) is connected to a prismatically shaped ceramic part 2 having grooves for guiding the stranded wire or the quartz tube ends. The spiral is formed so that holding and heating functions can also be performed by a handling device or robot apparatus. The clearance 5 or access hole in the ceramic part 2 runs with its axis 10 parallel to the helix axis 8 of the quartz helix 1. The ceramic part 2 has clearances 12, 13 on two mutually opposite outer sides, to allow the quartz tube ends 14, 15 (at 45° angles with respect to the helix axis) to be held while the stranded wire (not visible) exits for the electrical connection.

Figure 2:
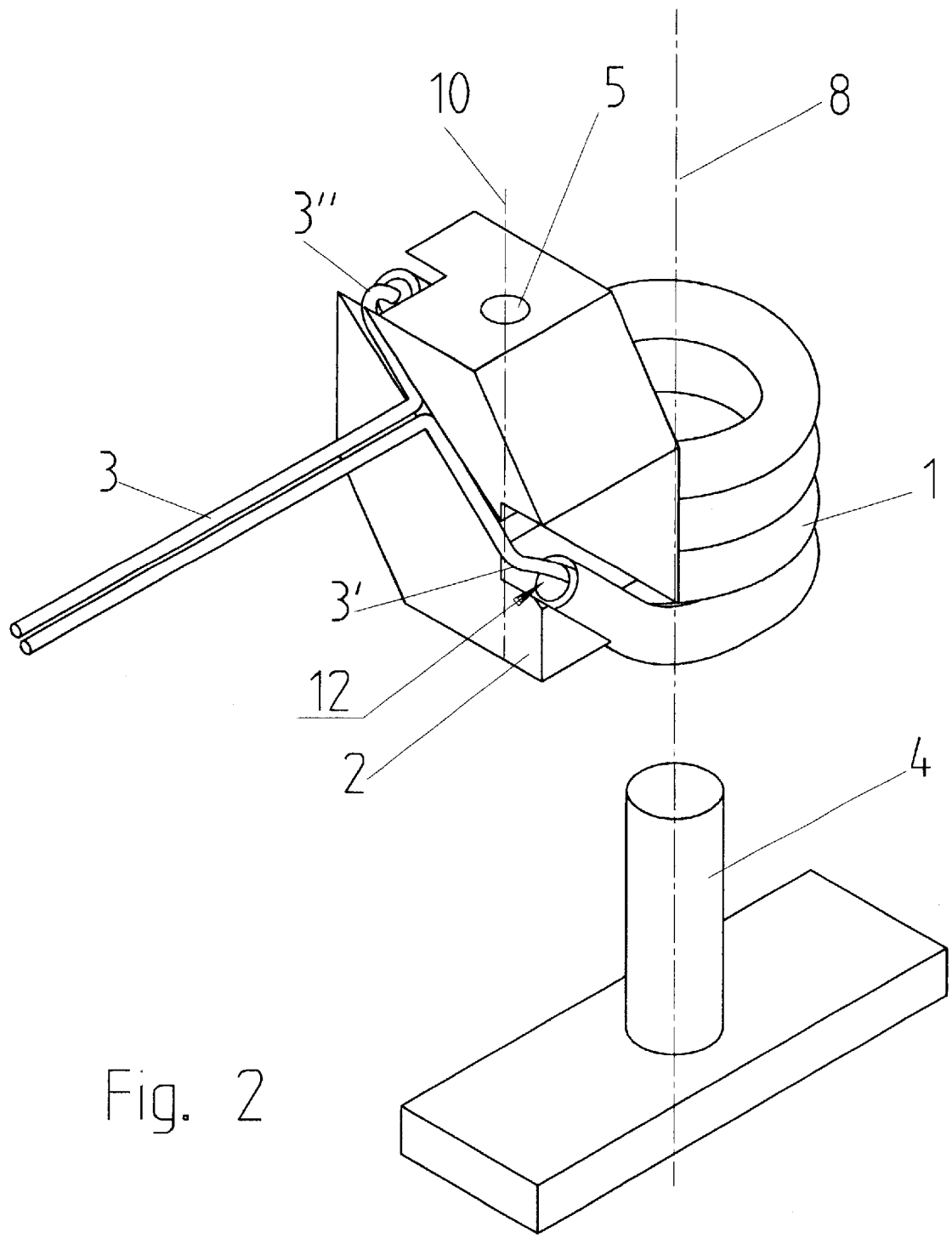
FIG. 2 shows the orientation of the plastic pin before being introduced into the quartz tube helix.

Referring now to FIG. 2, the positioning of a body of plastic material 4 to be introduced into the quartz helix 1 is shown. The body of plastic material 4 is designed with a pin shaped upper part which is to be shaped by heating with the aid of the quartz helix 1. A handling device (not represented here) for guiding the quartz tube helix 1 or a securing means (not represented here) for bodies of plastic material 4 can be used to apply the quartz tube helix to the pin shaped part of the body of plastic material along the helix axis 8. The quartz tube helix 1 is then heated via the electrical supply leads of stranded wire 3 by an energy supply (not shown) to such an extent that shaping in the region of the tip of the body of plastic material 4 can be performed due to the thermal radiation emitted.

FIG. 2 also reveals the exit of one of the two conductors 3' of stranded wire from one end of the quartz helix 1. The second conductor 3" of stranded wire 3 is a correspondingly connected at the other end of the quartz helix 1 to the heating conductor (not visible) in the helix. In principle, it is immaterial whether the quartz helix 1 is lowered onto the body of plastic material 4 or whether the body of plastic material 4 is pushed into the quartz helix 1 by means of a displaceable securing means. The important thing is the relative movement between the heat or radiation source and the body of plastic material. If a robot or handling device is used, the quartz helix 1 is pushed onto the body of plastic material 4 with the aid, for example, of a robot arm.

Figure 3:
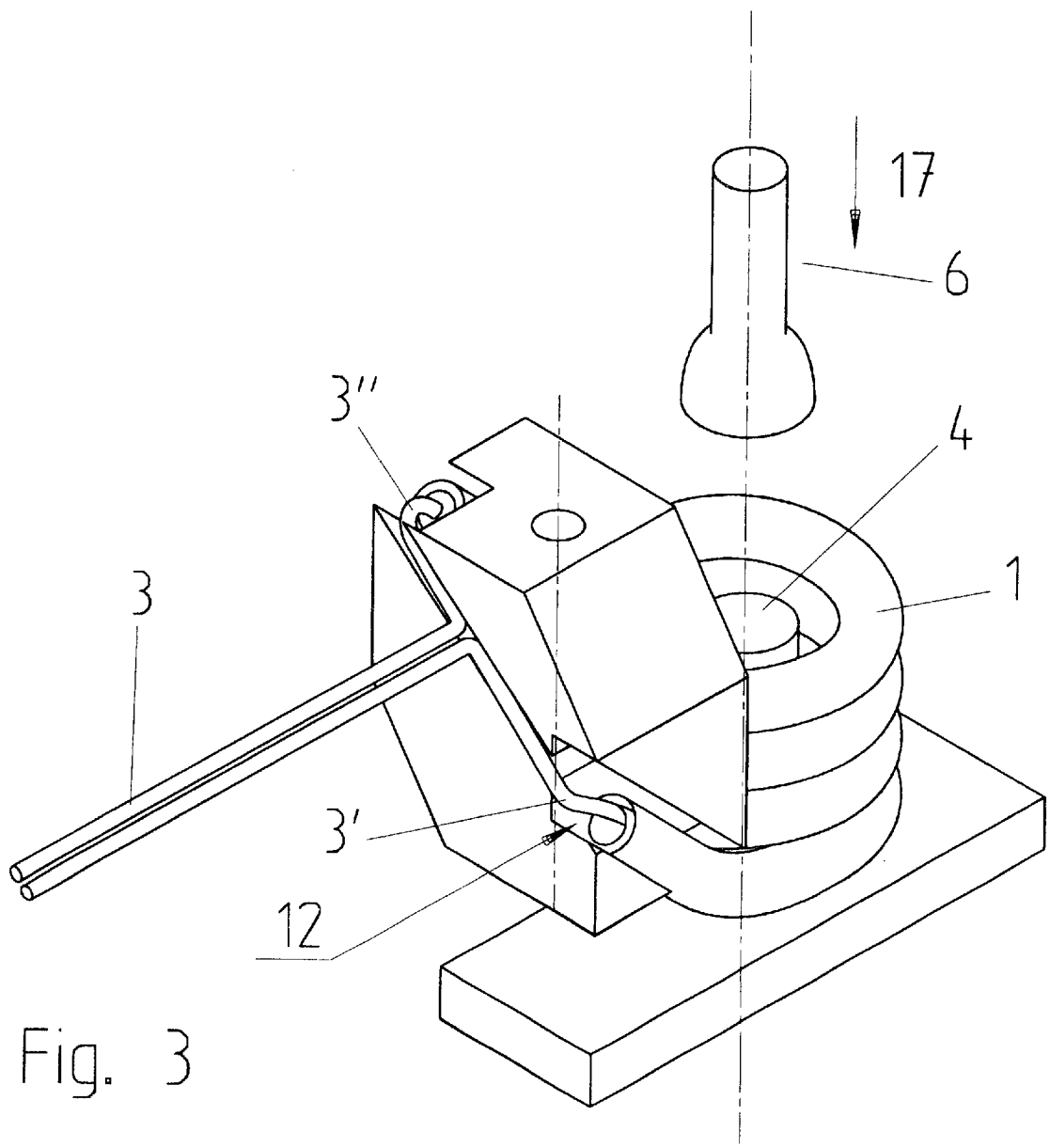
FIG. 3 shows the quartz helix on the body of plastic material with a rivet forming die being lowered into the quartz helix from above.

Referring now to FIG. 3, the body of plastic material 4 is shown with its pin shaped part in the interior of the quartz tube helix 1 and being pressed by the rivet forming die 6 in the direction of arrow 17 so that the end of the pin is transformed into a rivet head. The access hole 5 is aligned with its longitudinal axis 10 parallel to the helix A axis 8 so that production may be automated with the aid of the previously mentioned handling apparatus or robot apparatus.

Figure 4:
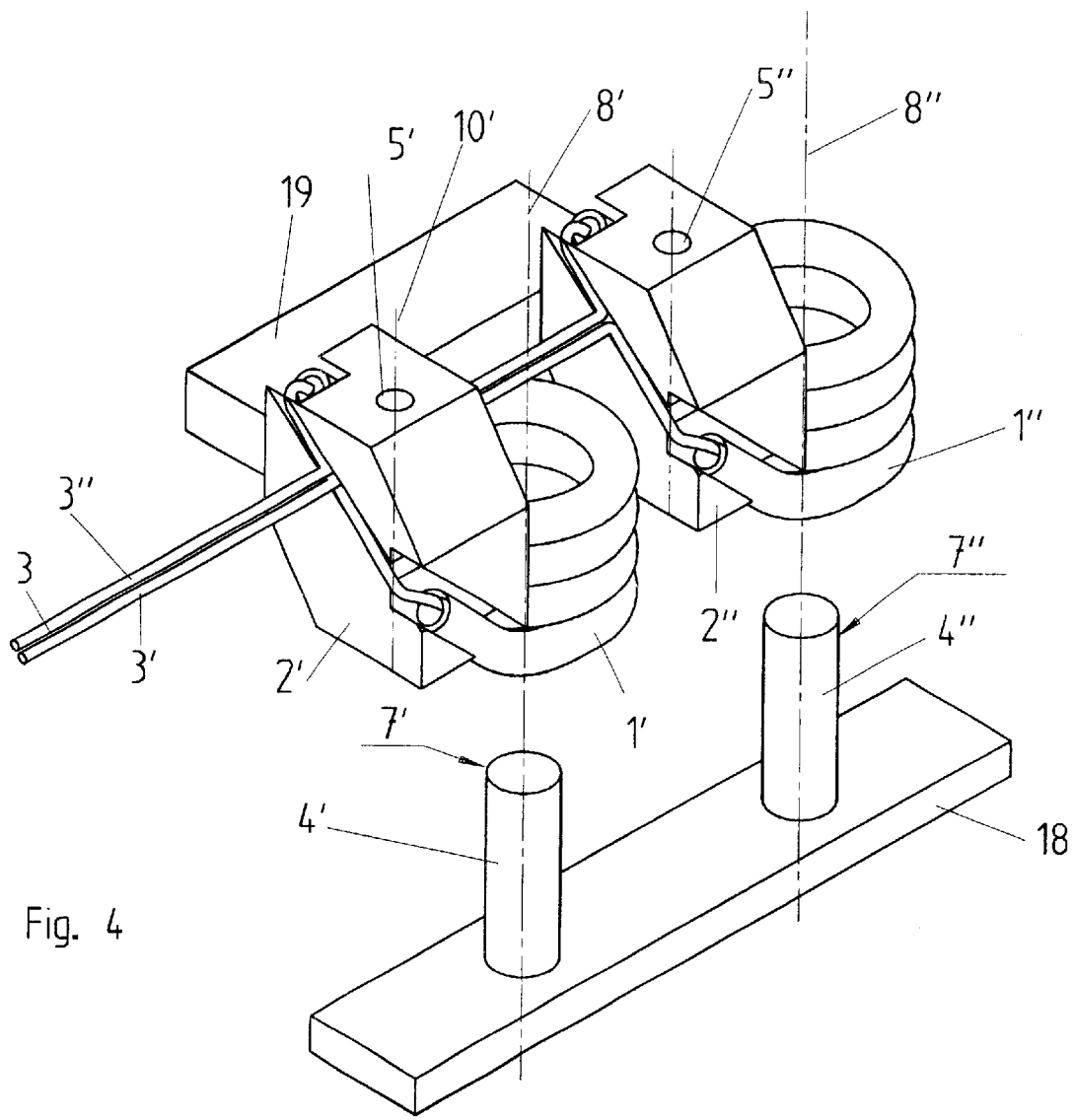
FIG. 4 shows an embodiment of the present invention where a body of plastic material having two pins is simultaneously heated by a pair of quartz tube helixes.

Referring now to FIG. 4, a body of plastic material 18 having two plastic pins 4', 4" connected to it, which are to be shaped by two quartz helixes 1', 1". The quartz helixes are located in common security means. A common rigid connection 19 allows the two heat resistant elements 2', 2" to be guided in parallel by means of a handling apparatus or robot arm (not shown here) so that, instead of the previous individual plastic pin 4, now two plastic pins 4', 4" can be heated simultaneously along the helix axes 8', 8" and subsequently shaped. Such an apparatus has the advantage that considerable time savings can be achieved by parallel heating, in particular in the case of two or more plastic pins to be shaped. In principle, however, it is also possible to heat and subsequently shape two or more plastic pins one after the other.

the clearance or access hole in elements 2', 2" are denoted by reference signs 5', 5", respectively. The axes of the clearance or access holes comprise reference signs 10', 10".

The diameter of the quartz tube is 5 to 8 mm, preferably 6 to 7 mm, while the wall thickness is preferably approximately 1 mm. The high temperature resistant ceramic of the ceramic part 2 consists of aluminum silicate or magnesium silicate or aluminum oxide. The electrical output of the quartz helix arrangement is from 150 to 350 watts. The wavelength of the emitted thermal radiation is from 2.1 $\mu$m to 2.7 $\mu$m.

While there have been shown and described and pointed out fundamental novel features of the present invention as applied to a preferred embodiment thereof, it will be understood that various omissions and substitutions and changes in the methods described and in the form and details of the devices illustrated, and in their operation, may be made by those skilled in the art without departing from the spirit of the present invention. For example, it is expressly intended that all combinations of those elements which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A method for shaping a part of a body of a plastic material in the form of a pin into a rivet, comprising the sequential steps of:

moving at least one of the plastic part over a heating apparatus into an operative position, wherein the heating apparatus comprises: a helix shaped quartz tube having a helix axis and tube ends, a heat radiator arranged in the quartz tube and including an electrical resistance wire having ends, the resistance wire being connectable to a power supply, and a heat resistant element operatively connected to the quartz tube at least in a region of the tube ends, the heat resistant element comprising an access hole having a longitudinal axis parallel to the helix axis, wherein the heat resistant element is moved along the longitudinal axis onto the pin shaped plastic part in the operative position;

securing the quartz tube in the operative position with respect to the plastic part using the heat resistant element while simultaneously heating the plastic part to a shaping temperature using the heating apparatus; and shaping the plastic part by introducing a rivet forming die onto the heated plastic part.

2. A method for shaping a part of a body of a plastic material in the form of a pin into a rivet, comprising the consequential steps of:

moving at least one of the plastic or a heating apparatus into an operative position, wherein the heating apparatus comprises: a helix shaped quartz tube having a helix axis and tube ends, a reflective layer arranged in the region of an outer circumference of the helix shaped quartz tube, a heat radiator arranged in the quartz tube and including an electrical resistance wire having ends, the resistance wire being connectable to a power supply, and a heat resistant element operatively connected to the quartz tube at least in a region of the tube ends, the heat resistant element comprising an access hole having a longitudinal axis parallel to the helix axis, wherein the heat resistant element is moved along the longitudinal axis onto the pin shaped plastic part in the operative position;

securing the quartz tube in the operative position with respect to the plastic part using the heat resistant element while simultaneously heating the plastic part to a shaping temperature using the heating apparatus; and shaping the plastic part by introducing a rivet forming die onto the heating plastic part.

3. A method for shaping a plurality of pin shaped parts of a body of plastic material into rivets, comprising the sequential steps of:

moving at least one of the plurality of plastic parts or a heating apparatus into an operative position, wherein the heating apparatus comprises: a plurality of helix shaped quartz tubes each having a helix axis and tube ends, a plurality of heat radiators, one of the heat radiators being arranged in each respective quartz tube, wherein each heat radiator includes an electrical resistance wire having ends, the wire being connectable to a power supply, and a plurality of heat resistant elements operatively connected to each respective quartz tube at least in a region of the tube ends, each heat resistant element comprising an access hole having a longitudinal axis parallel to the helix axis of each respective quartz tube, wherein each heat resistant element is pushed along the longitudinal axis of each respective access hole onto a respective plastic part in the operative position; securing the quartz tubes in the operative position with respect to the plastic parts using the heat resistant elements while simultaneously heating the plastic parts to a shaping temperature using the heating apparatus; and shaping the plastic parts by introducing a plurality of rivet forming dies onto the plastic parts.

4. A method for shaping a plurality of pin shaped parts of a body of plastic material into rivets, comprising the sequential steps of:

moving at least one of the plurality of plastic parts or a heating apparatus into an operative position, wherein the heating apparatus comprises: a plurality of helix shaped quartz tubes each having a helix axis and tube ends, a reflective layer arranged in the region of an outer circumference of each helix shaped quartz tube, a plurality of heat radiators, one of the heat radiators being arranged in each respective quartz tube, wherein each heat radiator includes an electrical resistance wire having ends, the wire being connectable to a power supply, and a plurality of heat resistant elements operatively connected to each respective quartz tube at least in a region of the tube ends, each heat resistant element comprising an access hole having a longitudinal axis parallel to the helix axis of each respective quartz tube, wherein each heat resistant element is pushed along the longitudinal axis of each respective access hole onto a respective plastic part in the operative position;

securing the quartz tubes in the operative position with respect to the plastic parts using the heat resistant elements while simultaneously heating the plastic parts to a shaping temperature using the heating apparatus; and shaping the plastic parts by introducing a plurality of rivet forming dies onto the plastic parts.

* * * * *